INVENTORS
Charles H. Jones and
Gordon S. Ley.

Sept. 6, 1955   C. H. JONES ET AL   2,717,329
TELEVISION SCAN SYSTEM

Filed Sept. 19, 1950   7 Sheets-Sheet 2

WITNESSES:
E. A. McCloskey
R. M. Brodshl

INVENTORS
Charles H. Jones and
Gordon S. Ley.
BY
F. E. Browder
ATTORNEY

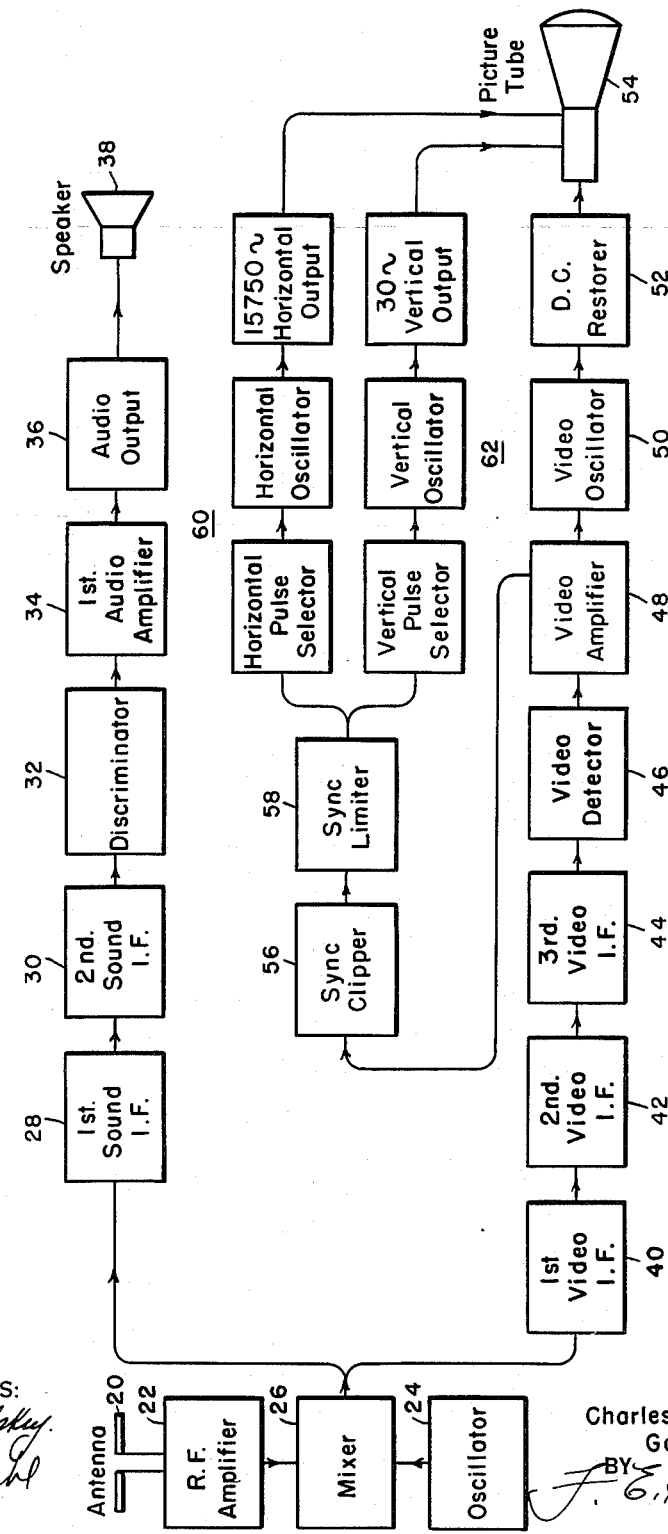

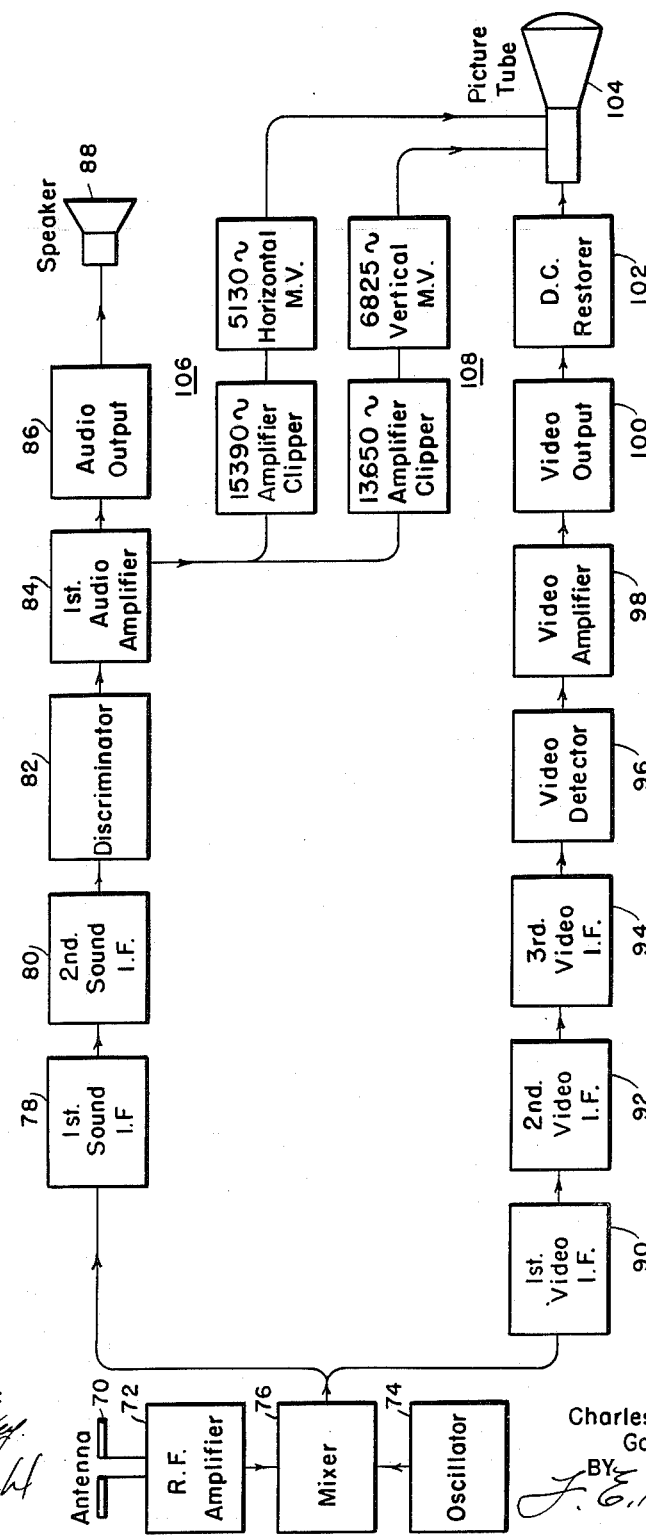

Sept. 6, 1955  C. H. JONES ET AL  2,717,329
TELEVISION SCAN SYSTEM
Filed Sept. 19, 1950  7 Sheets-Sheet 5

WITNESSES:
E. A. McCloskey
R. G. Brodshl

INVENTORS
Charles H. Jones and
Gordon S. Ley.
BY F. E. Browder
ATTORNEY

Sept. 6, 1955  C. H. JONES ET AL  2,717,329
TELEVISION SCAN SYSTEM
Filed Sept. 19, 1950  7 Sheets-Sheet 6

WITNESSES:
E.A. McCloskey
R.M. Brodshl

INVENTORS
Charles H. Jones and
Gordon S. Ley.
BY
F. E. Browder
ATTORNEY

Sept. 6, 1955  C. H. JONES ET AL  2,717,329
TELEVISION SCAN SYSTEM
Filed Sept. 19, 1950  7 Sheets—Sheet 7

WITNESSES:
E. A. McCloskey.
R. G. Brodshf

INVENTORS
Charles H. Jones and
Gordon S. Ley.
BY
F. E. Crowder
ATTORNEY

United States Patent Office 2,717,329
Patented Sept. 6, 1955

2,717,329

TELEVISION SCAN SYSTEM

Charles H. Jones and Gordon S. Ley, Pittsburgh, Pa., assignors to Westinghouse Electric Corporation, East Pittsburgh, Pa., a corporation of Pennsylvania Application September 19, 1950, Serial No. 185,678

2 Claims. (Cl. 315—24)

Our invention relates to television, and more particularly to television scanning apparatus.

In television systems in accordance with the teachings of the prior art, the picture quality is severely limited by the bandwidth and channel restrictions. As a matter of fact this has become so problematical that the Federal Communications Commission, faced with the necessity of either deteriorating the picture quality by squeezing more channels into the available range, or limiting the number of stations, has temporarily discontinued issuing licenses to operate television stations.

It is, accordingly, an object of our invention to provide a television system which shall provide a television system which shall yield a higher picture quality for a given transmission bandwidth.

Another object is to provide a television system which can furnish the same picture quality as prior art apparatus with a substantial reduction in necessary bandwidth.

It is an ancillary object of our invention to provide a television scanning system such that the video signals can be transmitted without interruption for blanking pulses, synchronizing pulses or equalizing pulses.

It is another ancillary object of our invention to make unnecessary the use of blanking pulses in the complete operation of television scanning apparatus.

Still another object is to provide a television scanning system in which the electron beam continuously scans the tube face.

A further ancillary object is to provide a television system in which the picture information is transmitted continuously in the video channel.

A still further ancillary object is to disperse ghost images in the reproduced televised picture and to minimize static interference.

An additional object is to improve the operational efficiency of television systems.

Another object is to minimize the difficulty caused by the loss of synchronizing pulses in the prior art television scanning system.

A different object is to avoid repetition in the scanning pattern of television apparatus.

Our invention arises from the realization that the prior art bandwidth and channel limitation result from failure to make full use of the time available for scanning.

The total time available for the completion of a scan is determined by the physiology and the physics of a television project. It is essential, for example, that 30 frames be scanned per second. The number of scanning lines determined in accordance with the devised picture definition must therefore be squeezed into 1/30 of a second. If a large fraction of this 1/30 second is to be devoted to blanking and synchronization pulses, there is correspondingly less time available for actual scanning. To cover the whole picture the scanning must take place at a correspondingly higher rate. A scanning line traced out at a given rate as it passes over the distinctive portion of the picture produces voltage impulses of which rise and fall at a corresponding rate; the higher the rate the more abrupt the rise and fall of the pulses. The transmission bandwidth is governed by the fidelity with which it is desired that these pulses be reproduced; the greater the bandwidth the higher the fidelity for a pulse of a given abruptness. However, as the abruptness of the pulses increases, the high frequency harmonic components of each pulse increases and the bandwidth required to achieve a given fidelity increases correspondingly. Therefore, the high rate scanning in accordance with the teachings of the prior art demands a high bandwidth for a given fidelity.

According to our invention the scanning is continuous. No hiatus occurs after each scan for transmitting synchronization and blanking pulses. The additional time afforded by elimination of this hiatus is available for scanning and the scanning may take place at a correspondingly lower rate for the same picture definition. The required bandwidth for a given fidelity may then be correspondingly smaller. With our system the horizontal deflection control frequency may be $15 \times 342 = 5{,}130$ C. P. S., and the vertical deflection control frequency may be $15 \times 455 = 6{,}825$ C. P. S. With a 4 to 3 aspect ratio the upper and lower picture borders are longer than the side borders, so the vertical deflection control voltage should have a correspondingly higher frequency.

In accordance with our invention, the respective electron beams of the television camera and receiver tubes are caused to scan continuously their tube faces without blanking. We apply equal-sided triangular shaped control voltages to the beam deflection means to cause the electron beam to follow the desired continuous scanning pattern.

The novel features that we consider characteristic of our invention are set forth with particularity in the appended claims. The invention itself, however, both as to its organization and its method of operation, together with additional objects and advantages thereof will best be understood from the following description of specific embodiments when read in connection with the accompanying drawings, in which:

Figure 11:
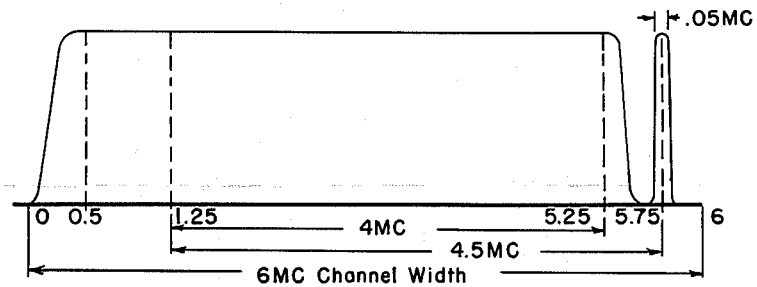
Figure 12:
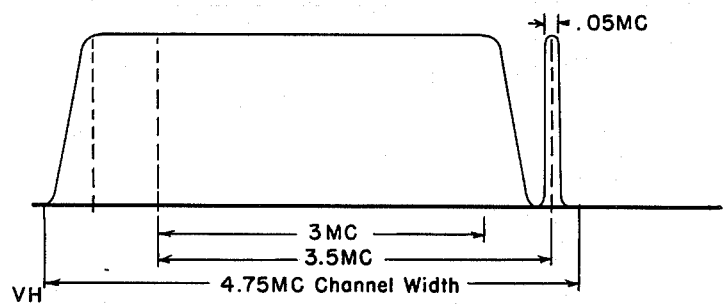
Figure 13:
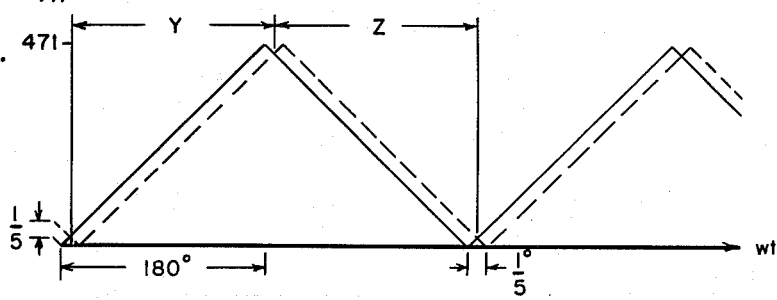
Figure 14:
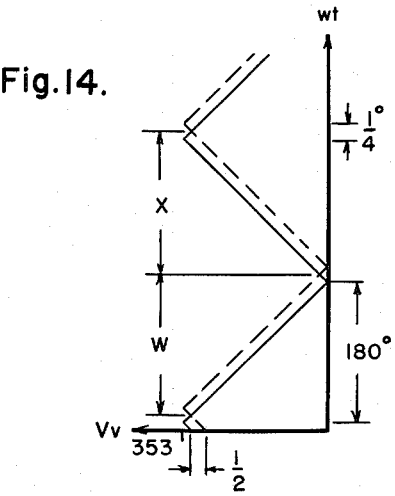
Figure 9:
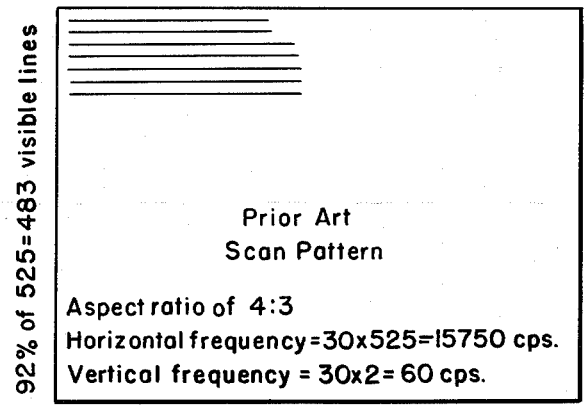
Figure 10:
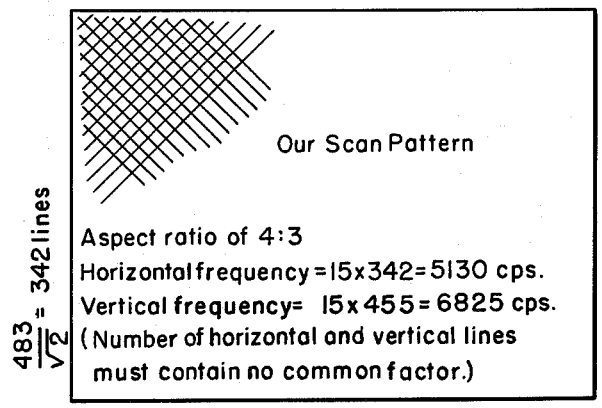
Figure 17:
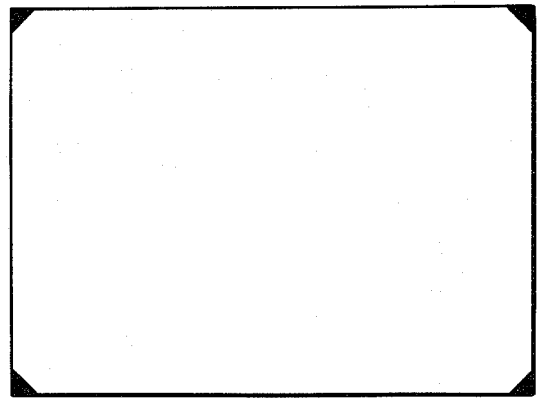
Figure 15:
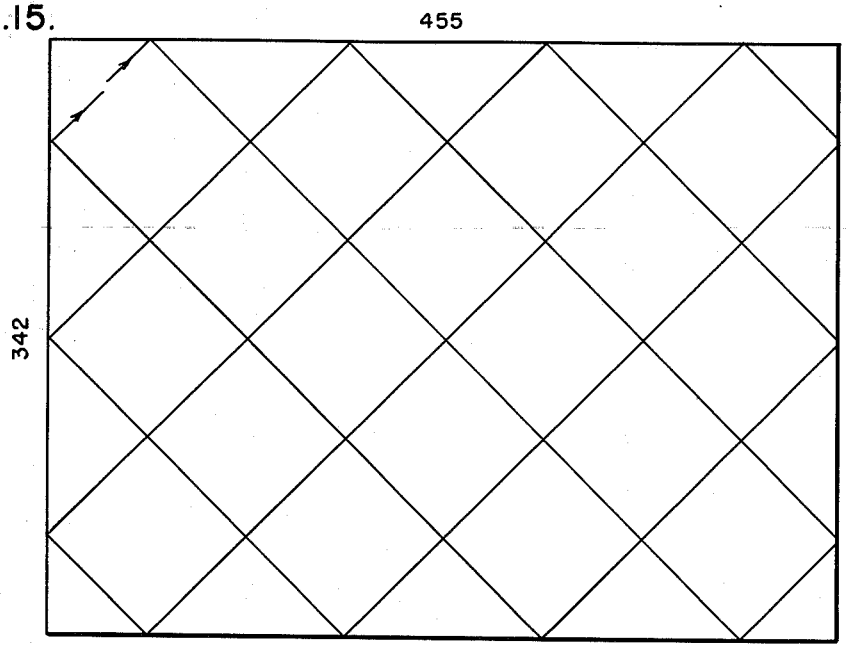
Figure 16:
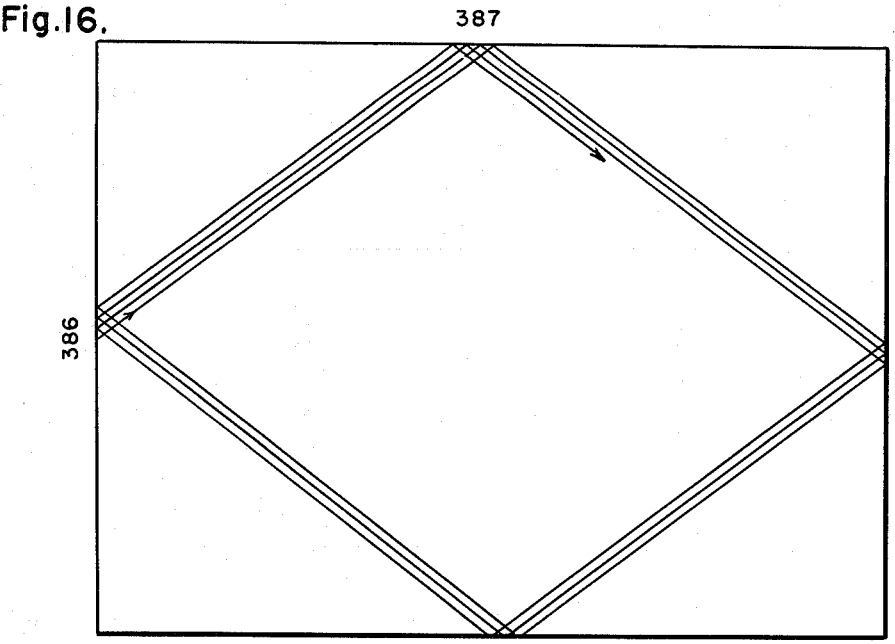

Fig. 7 diagrammatically shows the circuit arrangement of a television receiver in accordance with the prior art television systems;

Fig. 8 diagramatically shows a television receiver circuit in accordance with our invention;

Fig. 9 illustrates the scanned beam trace pattern on the tube face of prior art apparatus;

Fig. 10 illustrates one form of the scanned beam trace pattern on the tube face in accordance with our invention;

Fig. 11 illustrates the required bandwidth of the prior art television system;

Fig. 12 illustrates the narrower required bandwidth of a television system in accordance with our invention;

Fig. 13 illustrates the effect of a phase shift in the horizontal sweep voltage of our invention;

Fig. 14 illustrates the effect of a phase shift in the vertical sweep voltage of our invention;

In Fig. 15 is shown the fractional scan pattern which is obtained with our system when the horizontal and vertical deflection frequencies have a desirable relationship;

In Fig. 16 is illustrated the effect of employing horizontal and deflection frequencies which are too nearly equal; and Fig. 17 illustrates one manner of providing a black picture reference level at the picture tube.

Figure 1:
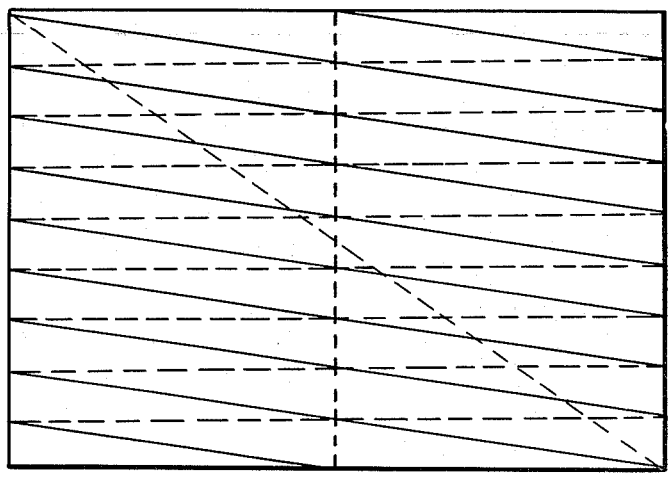
Figure 1 shows the representative nature of the prior art television scanned pattern on the tube face.

In Fig. 1 is shown the resultant scan pattern of the prior art televised picture showing the method of interlacing a plurality of fields to accomplish the complete televised picture. The interlacing of two such televised field patterns is accomplished by first sweeping the electron beam across the tube face and then blanking each return trace until a first field is completed, then blanking the electron beam trace while the electron beam is brought to the top of the picture to begin the second field and following through the horizontal trace of the electron beam in a manner similar to that described for the first field until the second field is completed. After the second field is completed to effectively form the complete televised picture, the electron beam is blanked out while its position is returned to the beginning of the first field. The operation is then repetitive to trace the first field and subsequently the second field to accomplish the complete transmission of the televised picture. The present television standards are such that for interlaced scanning of two fields the complete picture is changed thirty times per second, and the field repetition rate is sixty times per second. The present standards require 525 horizontal lines per picture which results in 262½ lines per field. In this manner one complete picture made up of two fields is scanned, each 1/30 of a second.

Figure 2:
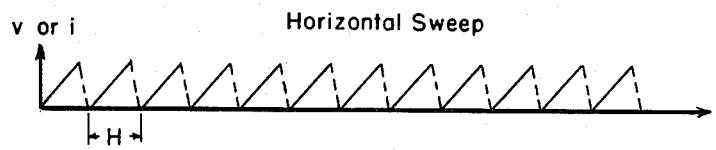
Fig. 2 shows the saw-tooth wave form of the prior art sweep voltage.

The horizontal sweep wave form shown in Fig. 2 is that employed in the prior art television systems. It is generated by means of a saw-tooth generator in a well known manner. The frequency of this horizontal sweep voltage is in the order of 15,750 cycles per second, or 525 lines per picture times the 30 picture rate per second.

Figure 3:
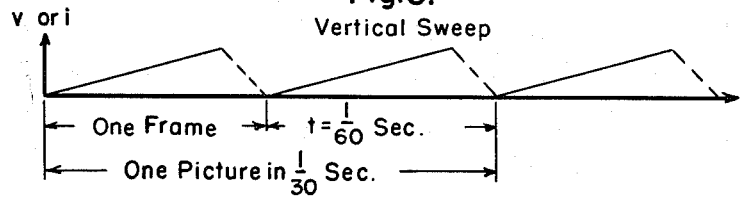
Fig. 3 shows the saw-tooth wave form of the prior art vertical sweep voltage.

The wave form in Fig. 3 shows the vertical sweep control voltage. This wave form is also generated usually by means of a saw-tooth generator. Each saw-tooth is of such a length that it occurs at the rate of one for each field or frame of the scanned pattern. This would mean that two saw-teeth of the vertical sweep control voltage occur in the period of one picture or 1/30 of a second to make the resultant vertical sweep control voltage have a frequency of 60 cycles per second in order to trace the 60 fields per second which make up the 30 pictures per second.

Figure 4:
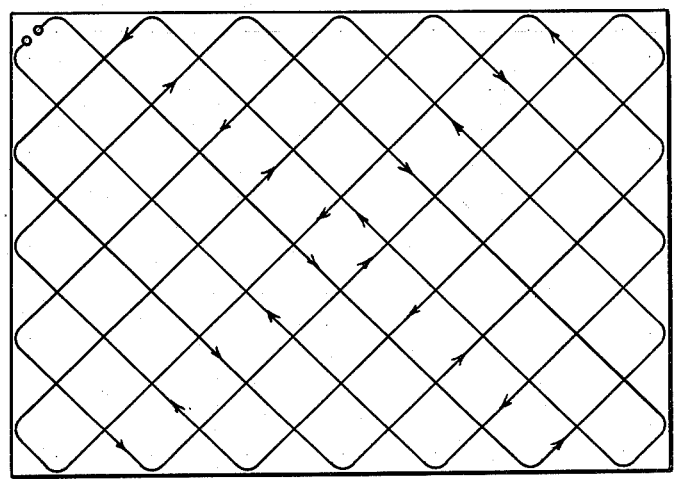
Fig. 4 illustrates the scan pattern on the tube face in accordance with our invention.

In Fig. 4 is shown the resultant scan pattern in accordance with our invention. The electron beam effectively traces a great many more fields than the prior art apparatus to reproduce a single televised picture. This would mean that the field frequency in accordance with our invention is many times greater than the field frequency of the prior art apparatus, say in the order of one hundred compared to the usual two or four employed in the prior art apparatus. There is no need for blanking of the electron beam at any time during the complete scanning operation. This allows the continuous scanning system in accordance with our invention to transmit without interruption picture information in the video channel, because the need for synchronizing pulses and blanking pulses is eliminated.

Figure 5:
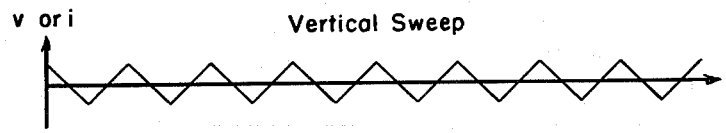
Fig. 5 shows the equal-sided triangular wave form of the vertical sweep voltage in accordance with our invention.

In Fig. 5 is shown the isosceles triangular wave form of the vertical sweep voltage, which is employed in our television scanning system. The vertical sweep voltage wave form, as shown in Fig. 5, would cause the electron beam to uniformly move up and down the tube face in a vertical direction.

Figure 6:
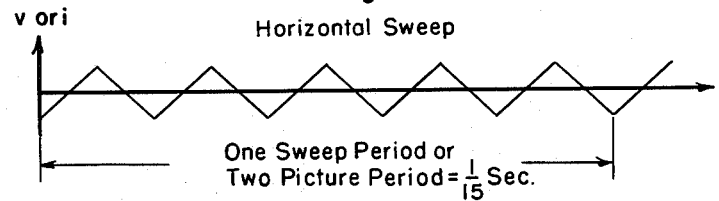
Fig. 6 shows the equal-sided triangular wave form of the horizontal sweep voltage in accordance with our invention.

In Fig. 6 is shown the isosceles triangular wave form of the horizontal sweep voltage in our system. This wave form causes the electron beam to be horizontally deflected at a linear rate, first to one side and then the other side of the tube face.

For a televised picture having an aspect ratio of 4 to 3, for example, the frequencies of the aforesaid vertical and horizontal sweep voltages can be chosen to reproduce the present picture having a standard 525 line picture. The horizontal frequency under these conditions could be chosen to be 5,130 cycles per second. The vertical frequency could be chosen to be 6,825 cycles per second. The relationship between the aspect ratio and the respective deflection control frequencies will be subsequently discussed in greater detail in conjunction with Figs. 9 and 10.

In Fig. 7 is shown a television receiver apparatus in accordance with the teachings of the prior art. The input signal to this apparatus includes the picture information in the video channel and the sound information in the audio channel. In the prior art apparatus, the video carrier has modulated upon it, in addition to the said picture information, the synchronizing pulses and blanking pulses. The latter pulses require about 25% of the video carrier time which allows only about 75% for the transmission of picture information.

The receiver antenna 20 picks up both the video and audio carriers, with their respective modulating information. This input is passed through an R. F. amplifier 22 and beat against the output of a local oscillator 24 in a mixer circuit 26. The audio information goes into the audio sound circuit including a first 28 and second 30 sound I. F. amplifier, a discriminator 32, a first audio amplifier 34 and an audio output power amplifier 36 leading to the sound reproduction speaker 38. The video information enters a second circuit including a first 40, second 42 and third 44 video I. F. amplifier, a video detector 46, a video amplifier 48, a video oscillator 50 and a D. C. restorer 52 circuit leading to the electron beam control grid of the cathode ray tube 54. A third circuit is coupled into the plate circuit of the video amplifier 48 to remove from the video channel the synchronizing and blanking pulses which control the deflection of the electron beam. This third circuit, which controls the electrom beam deflection, includes a synchronizing pulse clipper 56 and limiter 58 which lead into respectively a horizontal deflection circuit 60 and a vertical deflection circuit 62. Each of these deflection circuits includes pulse selectors, which chose the respective synchronizing pulses in accordance with their frequencies, and saw-tooth generating means leading to the respective horizontal or vertical deflection elements in the cathode ray tube 54.

In Fig. 8 is shown a television receiver circuit in accordance with our invention. The input circuit, including an antenna 70, an R. F. amplifier 72, a local oscillator 74 and a mixer circuit 76 for beating the input signals against those of the local oscillator, is the same as that of the above described prior art receivers. The sound signals are passed into a separate circuit including first 78 and second 80 sound I. F. amplifiers, a discriminator 82, a first audio amplifier 84 and an audio power output amplifier 86 leading to a sound reproducing speaker 88. The video circuit is generally similar to the video circuit of the prior art apparatus in that it includes a first 90 and second 92 and third 94 video I. F. amplifier, a video detector 96, a video amplifier 98, a video oscillator 100 and a D. C. restorer 102 which lead to the electron beam control grid of the image tube 104.

The deflection circuits shown in Fig. 8, in accordance with our invention, are coupled into the sound circuit rather than the video circuit as previously done in the prior art television receivers. This is due to the fact that the sound carrier now has modulated upon it the beam deflection control voltages, rather than the video carrier containing this modulation as done in the prior art apparatus. The beam deflection circuits 106 and 108 are coupled into the sound circuit at the first audio amplifier stage 84, such that respective amplifier and clipper circuits in the horizontal and vertical deflection control circuits 106 and 108 detect the horizontal control voltage and the vertical control voltage. In order to generate the horizontal and vertical triangular wave form control voltages at the receiver, suitable sources of the required control frequencies are provided at the receiver, and triggered or governed by signals sent from the transmitter. For example, a 5,130 cycle per second horizontal deflection signal source and a 6,825 cycle per second vertical deflection signal source, or suitable sources of harmonics or subharmonics of these two frequencies, are available at the receiver. Perhaps, the most desirable manner of providing these frequencies at the receiver is to add respectively 15,390 cycle per second signals and 13,650 cycle per second signals to the audio carrier at the transmitter. At the receiver these latter frequency signals can be used to trigger the required frequency multivibrators. This is the illustrated means shown in the circuit of Fig. 8.

Other methods of providing the desirable frequencies at the receiver could include adding a subharmonic of the desirable isosceles triangular control voltage frequency to the video carrier, and remove them from the picture signal at the receiver with sharp notch filters. Another method would be to transmit the respective triangular wave form control voltages on a third carrier. The latter method would require the addition of a sweep I. F. channel to the receiver in addition to the sound I. F. and video I. F. channels illustrated by Fig. 8. An additional practical method would be to transmit these respective electron beam deflection control signals by the use of convenient telephone lines to the receiver.

In Fig. 9 is illustrated the scanned beam trace pattern employed in the prior art apparatus. An aspect ratio of 4 to 3 has been chosen for illustrative purposes only, and because this is one of the more common and popular ratios for television picture use. In actual practice about 8% of the vertical sweep time is required for the transmission of vertical blanking, and this means that 92% of the horizontal lines are visible. The latter feature effectively leaves about 525×92=483 visible lines per picture. The horizontal and vertical deflection control frequencies necessary to produce thirty pictures a second are respectively 525×30=15,750 C. P. S. and 30×2=60 C. P. S. The vertical control frequency assumes two interlaced fields per picture.

In Fig. 10 is illustrated the scanned beam trace pattern on the television tube screen in accordance with our invention. If the illustratory aspect ratio of 4 to 3 chosen respecting Fig. 9 is applied here, the same spacing between adjacent beam traces is used, and the traces cross perpendicularly, the horizontal and vertical deflection control frequencies necessary with our apparatus can be determined without difficulty. One important consideration to prevent pairing of lines is to have the relationship between the latter frequencies such that they have no common factor other than the Lissajous rate. Two pictures are presented every Lissajous period. Since the traces or lines cross perpendicularly and the spacing between traces is the same, the relationship of a right triangle can be applied to determine the new horizontal frequency for our system. Accordingly, the number of traces which touch the side picture borders is $$483 \div \sqrt{2} = 342$$

The number of traces which touch the upper and lower picture borders is 4/3×342=455. The numbers 342 and 455 have no common factor so they are satisfactory. The numbers 342 and 456 could not have been used. Since our scan covers the entire picture area twice in every Lissajous period, a picture rate of 30 per second corresponds to a Lissajous rate of 15 per second.

A comparison of Fig. 11 with Fig. 12 will illustrate the more desirable bandwidth of the new system in accordance with our invention. The prior art television systems require about a 6 megacycle bandwidth. The bandwidth could be reduced to approximately 5 megacycles by the use of our system.

If the triangular waveform sweep control voltages are delayed in phase, the picture elements will be slightly displaced by a corresponding amount. In Fig. 13 is shown a horizontal control waveform which is delayed in phase. In Fig. 14 is shown a vertical control waveform which is delayed in phase. The waveform of Fig. 13 will cause the picture elements to be displaced a small amount from their proper position. The picture elements, as a result of a delayed vertical control waveform, as shown in Fig. 14, will be displaced a small amount from their proper position. We believe that in actual practice phase delay will not present too much difficulty. A phase shift or delay in either the horizontal or vertical sweep control voltages in the order of plus or minus two hundredths of a microsecond will be satisfactory in operation. It is practicable to maintain the phase delay of the control voltage within these limits for an extended period of time. Manual control knobs having a vernier control effect on these voltages could be provided on the exterior of the apparatus to correct station-to-station or day-to-day phase variations.

In the operation of a scanning beam, as shown by Figs. 1, 2 and 3, the saw-tooth horizontal sweep voltage shown in Fig. 2 in conjunction with the vertical sweep voltage shown in Fig. 3 will cause the electron beam to trace a first field pattern and subsequently a second field pattern with blanking of the retrace between successive lines of each field and of the retrace between fields.

In the operation of a scanning system, as illustrated in Figs. 4, 5 and 6, in accordance with our invention, the isosceles triangular waveform vertical sweep voltage shown in Fig. 5 and the isosceles triangular waveform horizontal sweep voltage shown in Fig. 6 will in conjunction cause the scanned picture pattern to follow that illustrated in Fig. 4. The electron beam continuously scans the tube face, and there is consequently no necessary blanking operation of the electron beam at any time. This allows the picture information to be continuously transmitted in the video channel, and in a narrower bandwidth. Furthermore, because of the nature of our continuous scan operation, ghost images are dispersed, and sensitivity to static is reduced. In the prior art television systems, static interference was very objectionable in that it caused a complete loss of synchronizing pulse signals or a resulting false synchronization. This was due to the fact that the horizontal synchronizing pulses are in the order of 5 microseconds wide, and static interferences in the nature of equally short pulse-like signals caused the horizontal sweep movement to synchronize the said static pulses instead of the transmitted synchronizing pulses. Our system is not subject to the latter objection.

The prior art television receiver apparatus, shown in Fig. 7, operated to remove the electron beam deflection control signals from the video I. F. channel. This meant that the electron beam deflection control signals had to be modulated on the video carrier and therefore required a fraction of the video carrier transmission time. This meant that to transmit a given amount of picture information the video carrier bandwidth had to be increased to make up for the lost time given to the blanking information. The receiver circuit shown in Fig. 7 illustrates the required design to remove the picture synchronizing information from the video channel.

In Fig. 8 is shown the revised and improved television apparatus in accordance with our invention. Here the deflection control circuits are coupled into the sound channel and not in the video channel, because the picture control information has been modulated on the sound carrier instead of the video carrier. This leaves the video carrier entirely available for the modulation of picture information, such that its bandwidth can be determined by the amount of picture information which it is desirable to transmit. The electron beam deflection control signals are modulated onto the sound carrier in a manner such that it is not necessary to appreciably increase the bandwidth of said sound channel.

It is a simple matter to generate the triangular wave form deflection control voltages at the receiver once the suitable control voltages are received at the receiver. The latter control voltages may be transmitted from the television transmitter in the form of two sinusoidal waves of fixed frequency modulating the sound carrier. At the receiver two square waves of the proper frequency can be derived from the two sinusoidal received signals. These square waves can then be applied to series RC circuits to give a triangular voltage wave form for electrostatic deflection or across RL circuits to give a triangular current wave form for magnetic deflection. It is a simple matter to make the respective RL or RC circuits have suitable time constants compared to the signal period.

Because blanking pulses are not needed in our system, picture information can be sent slower over the video carrier, and hence the bandwidth reduced, or if more desirable, the present bandwidth could be employed and the picture resolution improved. The television receivers of our system would be accordingly simplified in comparison to those of the prior art systems. The transmitter power could be reduced to approximately half its present value for the same signal to noise ratio at the receiver. In the prior art television system, the total energy transmitted during the blanked pulse intervals is actually greater than the total energy transmitted during the unblanked intervals. The average picture modulation level could be correspondingly increased with our apparatus and system. At the present the modulation level never exceeds approximately 75% during the time that the picture information is being transmitted. The picture quality would be favorably affected in several ways besides the picture resolution being improved if the present bandwidth were maintained, and our system employed. There would be a desirable tendency to disperse ghost images. The latter effect would be caused by the fact that adjacent traces of the electron beam are in opposite directions and also because each picture element is swept out twice during one Lissajous pattern. The two traces are at right angles to each other. Furthermore, the inherent continuous interlace of a television system in accordance with our system would improve the picture quality.

In this discussion, it was our intention that the respective scan lines have the same spacing between them in our system as in the prior art horizontal scan line systems, and that the continuous scan lines of our system cross at right angles or perpendicularly to each other to give a relatively square shaped area between the respective scan lines. However, the aspect ratio may be varied by changing the deflection control voltage magnitude for either or both deflection directions, and the scan lines may be made to cross each other non-perpendicularly. This would cause the areas between the adjacent scan trace centers to change from the above described substantially square shape, and under certain conditions is the more desirable. In practice, however, these scan traces have a finite width such that this described area defined by the trace centers is not noticeably formed.

Under our system any given substantial picture area will be partially scanned the same number of times as any other substantial area of the picture will be scanned. For example, one substantial area of the picture, such as the upper left picture area, will be crossed by the scan trace the same number of times substantially as the lower right area of the televised picture, and our scan is more uniformly distributed with respect to time. This has the same effect as a very high interlace ratio with the scan pattern of the prior art. We obtain an equivalent effect as an interlace ratio in the order of 100 respecting the prior art scan pattern. This allows complete pictures to be televised by our system at lower frequencies without noticeable flicker, and has the effect of spreading out the respective scanned portions of the picture.

In Figure 15 is illustrated the fractional scan pattern obtained after about 585 microseconds, or about one-one hundred and fourteenth of the complete scan pattern. In this period of 585 microseconds the scan trace has finished about four horizontal and three vertical movements, i. e., from one screen boundary to the opposite boundary and returned. During a full 1/15 of a second, complete picture area would be covered by the trace pattern and the areas between the traces illustrated in Fig. 15 would be accordingly filled in.

In the scan pattern illustrated in Figure 10, the ratio of the vertical deflection frequency to the horizontal deflection frequency was chosen to be approximately equal to the aspect ratio. Under the latter condition, the scanning beam traces crossed each other to form substantially square areas between adjacent traces.

In Fig. 16 is illustrated the scan trace pattern obtained by the use of a horizontal deflection frequency of 5790 cycles per second with a vertical deflection frequency of 5805 cycles per second, and allowing the scanning trace to move for the same period of time as used to generate the trace pattern shown in Figure 15. In said time period the length of the cumulative trace has been chosen to be the same in each of Figs. 15 and 16, and the time period necessary to complete a full scan pattern in each has been made the same in Fig. 16. It is evident from a comparison of Fig. 15 with Fig. 16 that the scan pattern of Fig. 15 is the more desirable respecting the scan coverage afforded any appreciable finite area of the scanned surface and the tendency for objectionable flicker.

In Fig. 15 the ratio of vertical to horizontal deflection frequencies was chosen to be about 4 to 3, for example 455 to 342. In Fig. 16 the same ratio between these frequencies was chosen to be about 1 to 1, for example 387 to 386. Actually these ratios could not be made exactly 4 to 3 or 1 to 1 because the Lissajous trace pattern, to fill in the areas between scan traces, must not repeat itself until after 1/15 of a second, since 15 of such completed patterns are traced each second.

If, for example, the above ratio were chosen to be approximately 2 to 1, a trace pattern would result which was more desirable than that illustrated in Fig. 16, but not as desirable as that shown in Figure 15. Many such ratios would be suitable, such as 5 to 3, 5 to 4, 7 to 3, 7 to 5, 8 to 5, 8 to 7, and so forth, for aspect ratios of four to three or one to one.

As a general rule in this regard, it is desirable that the frequency ratio be within the limits of 1/2 N or 2/1 N where N is the aspect ratio, otherwise the ratio of major to minor axis of the diamond shaped areas formed by the tracer will be greater than two. Picture quality will be best when instead of diamond shaped areas, these areas are reasonably square shaped because ghost dispersion is then optimum and because horizontal and vertical definition is then about equal.

In the prior art television systems, the amplitude of the synchronizing pulses is used for automatic gain control and for D. C. restoration. In order to establish a black reference level, with our system, it might be desirable to transmit a black triangle in one or all of the four corners of the transmitted picture, as shown in Figure 17. Since these corners do not generally appear to an observer of the screen, even with a rectangular faced tube, they would not be objectionable at the receiver. The circuit used in prior art apparatus to accomplish gain control is essentially a peak-reading vacuum tube voltmeter connected to the output of the second detector. The output of this peak reading device feeds a D. C. amplifier which in turn controls the I. F. gain. For our system, a similar circuit can be used except the time constant of the vacuum tube voltmeter circuit would be increased from a hundredth of a second to about one second. The reinsertion of the D. C. voltage at the final tube of the video amplifier is accomplished in a similar manner.

Although we have shown and described our invention as adapted for use with a continuous scan television system in which the electron beam is caused to follow a substantially Lissajous trace pattern, our invention is readily operable and adaptable to cause any beam of electronmagnetic energy to sweep over an area in a continuous manner similar to what has been described in detail above. A beam of light or a radar beam, for example, may be swept over a given area in a continuous manner as may be desirable in many applications.

Although we have shown and described certain specific embodiments of our invention, we are fully aware that many modifications thereof are possible. Our invention therefore is not to be restricted except insofar as is necessitated by the prior art and by the spirit of the appended claims.

We claim as our invention:

1. In combination a cathode ray tube having a sensitive screen and including scanning means adapted to have impressed thereon first and second right-angle components of a scanning parameter, corresponding respectively to the aspects $a$ and $b$ of the aspect ratio $$\frac{a}{b}$$

of said screen; said screen to be scanned at the rate of $r$ complete scans per second, each complete scan terminating along the $b$ aspect of said screen $n$ times; means for supplying to said scanning means, a first scanning parameter component having a frequency $v$ and the wave form of the equal sides of an isosceles triangle, and means for supplying to said scanning means a second scanning parameter component at right angles to said first component having a frequency $w$ and the wave form of the equal sides of an isosceles triangle, where $v$ substantially equals $nr$ and $w$ substantially equals $$n\frac{a}{b}r$$

and numerical $n$ and $$n\frac{a}{b}$$

are so related that they do not have a common factor.

2. The combination according to claim 1, characterized by the fact that $$\frac{a}{b}=1$$

and by the further fact that $v$ and $w$ are so related that $$\frac{v}{w}$$

is of the order of 3/4.

References Cited in the file of this patent
UNITED STATES PATENTS

| | | |
|---|---|---|
| 2,143,933 | Bartheleny | Jan. 17, 1939 |
| 2,161,305 | Messner | June 6, 1939 |
| 2,172,395 | McSpadden | Sept. 12, 1939 |
| 2,250,819 | Wolf | July 19, 1941 |
| 2,412,210 | Edson et al. | Dec. 10, 1946 |
| 2,426,721 | Adams | Sept. 2, 1947 |
| 2,572,586 | Barney | Oct. 23, 1951 |